Sept. 29, 1936.  J. P. KENYON  2,055,978

DEVICE FOR CLOSING JARS

Filed Oct. 21, 1935

Inventor

Julia Palmer Kenyon

By Thomas E. Robertson

Attorney

Patented Sept. 29, 1936

2,055,978

UNITED STATES PATENT OFFICE 2,055,978

DEVICE FOR CLOSING JARS

Julia Palmer Kenyon, Owasco, N. Y.

Application October 21, 1935, Serial No. 46,045

3 Claims. (Cl. 7—1)

This invention relates to an improved device for closing jars. The object of the invention is to provide a simple and effective device which may be used to quickly and effectively close jars containing fruit or other material being packed. In its preferred embodiment the device comprises a member to co-act with the jar and a second member designed to co-act with the bail of the jar closure in such a manner that the operator may apply the device to the jar and quickly move the locking device so that jars may be rapidly sealed one after another.

In the drawing accompanying and forming part hereof:

Figure 1:
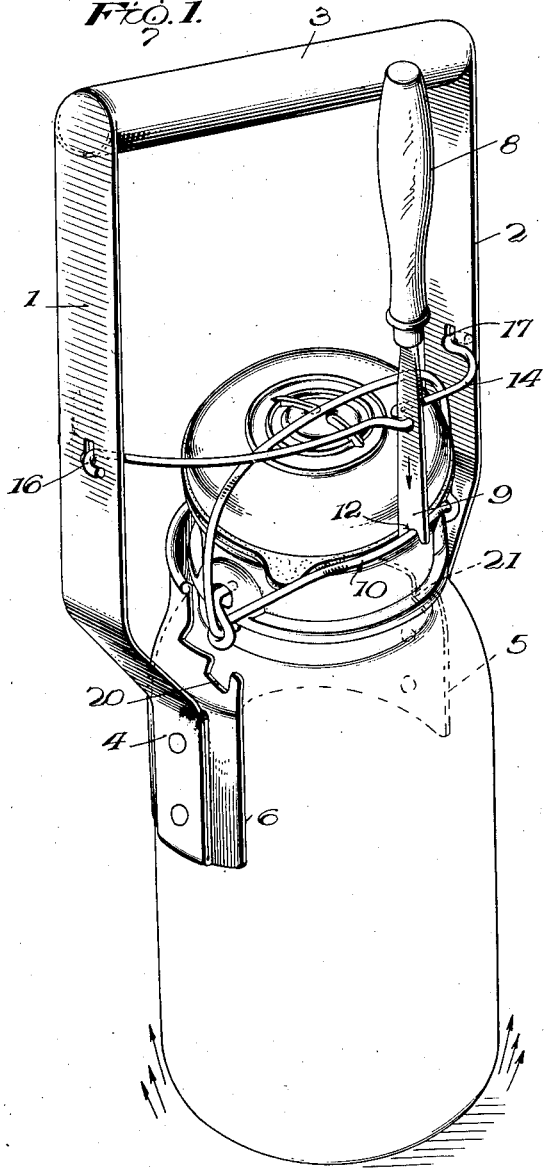
Fig. 1 is a perspective view of a jar having my device applied thereto, the parts being in the position they occupy before the jar closing bail is moved to seal the jar.
Figure 2:
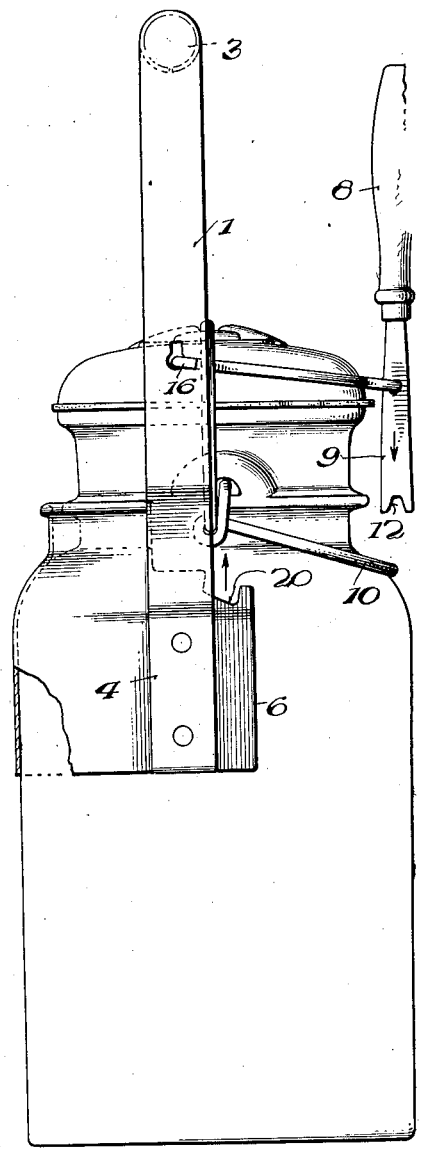
Fig. 2 is a side elevation of the same after the tool has forced the bail down into its locked position.

Referring now to the details of the drawing by numerals: 1 and 2 represent the side arms of a frame, the upper ends of which are connected by a handle 3, and the lower ends 4 and 5 connected to a frame member 6 preferably formed of semi-circular shape adapted to fit one side of the neck of a jar such as used for preserving, canning, etc. It will of course be undertood that the member 6 may be formed of different sizes and shapes in order to fit different types of jars. The frame comprising the side arms 1 and 2 is designed to support a handle 8 in such a manner that the lower end 9 of the handle may contact with the bail 10 of the locking device. In order to better accomplish this purpose the lower end 9 of the handle is provided with a notch 12 so that the wire bail 10 of said locking device may be more easily operated. The handle 8 is preferably pivotally held in co-operative relationship with the side arms 1 and 2 by means of a supporting yoke 14 preferably formed of wire and pivotally connected to the side arms 1 and 2 as shown at 16 and 17.

In the operation of my device, there is a particular coaction between the semi-circular frame 6 when placed in position on one side of the jar and the horizontal handle 3 and its vertical handle 8. These parts are so constructed and correlated that when the operator holds the horizontal handle 3 in such a position that the semi-circular member 6 contacts with the jar, and the operator then moves the vertical handle 8 downward against the bail 10, the semi-circular member 6 being on one side of the jar and the vertical handle 8 acting upon the bail 10 as a fulcrum on the opposite side of the jar, there is a joint action and co-operation of the parts which hold the semi-circular member against the jar as though it were locked thereon.

Figure 3:
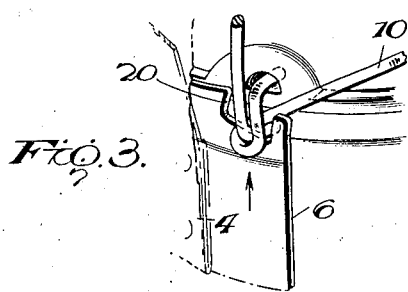
Fig. 3 is a perspective detail showing how the device co-operates with the jar closure when the device is being used to lift the jar out of the hot water in which the sealing or closing step has been effected.

I desire to call particular attention to the fact that in its preferable embodiment the frame member 6 is provided with recesses 20 and 21 which are so located that the side portions of the semi-circular frame member 6 may be lifted upwardly with respect to the jar and its wire locking member so that in its further upward movement, the said frame member 6 will contact with a portion of the wire locking member so that it may be used to lift the jar out of the hot water in which it has been placed. The operation of this feature is shown in Figure 3.

From the foregoing and accompanying drawing it will be seen that I have invented a device which may be used for rapidly sealing jars, one after another, and by which each jar may be quickly removed from the pan containing the jars without the operator dipping her hands into the hot water.

It is obvious that changes may be made in the form and construction of my invention without departing from the spirit thereof, and therefore reference should be made to the appended claims to determine the scope thereof.

I claim:

1. In a device for sealing jars of the type having a locking device including a bail, a member shaped to contact and coact with one side of a jar, a handle connected with the member, and a second handle pivotally supported by the first named handle but located on the opposite side of the jar and adapted to engage the bail whereby the downward movement of the second handle on one side of the jar in swinging the locking bail downwardly will cause the first mentioned member to move toward and engage the opposite side of the jar.

2. In a device for sealing jars of the type having a locking device including a bail, a member shaped to contact and co-act with one side of a jar, a handle connected with the member, and a second handle shaped to co-act with and to swing the bail into locking position by a downward movement thereof, said second handle being pivotally supported by the first handle but located on the opposite side of the jar whereby the movement of the second handle on one side of the jar in operating the locking device will cause the first mentioned member to engage the opposite side of the jar.

3. In a device for sealing jars of the type having a locking device including a bail, a member shaped to contact with one side of a jar and constructed to fit under and engage the locking device of the jar, and a handle connected with said member whereby the device may be used to lift the jar.

JULIA PALMER KENYON.